J. E. LOWE.
MEASURING PUMP.
APPLICATION FILED NOV. 17, 1913.
1,130,912.  Patented Mar. 9, 1915.
2 SHEETS—SHEET 1.
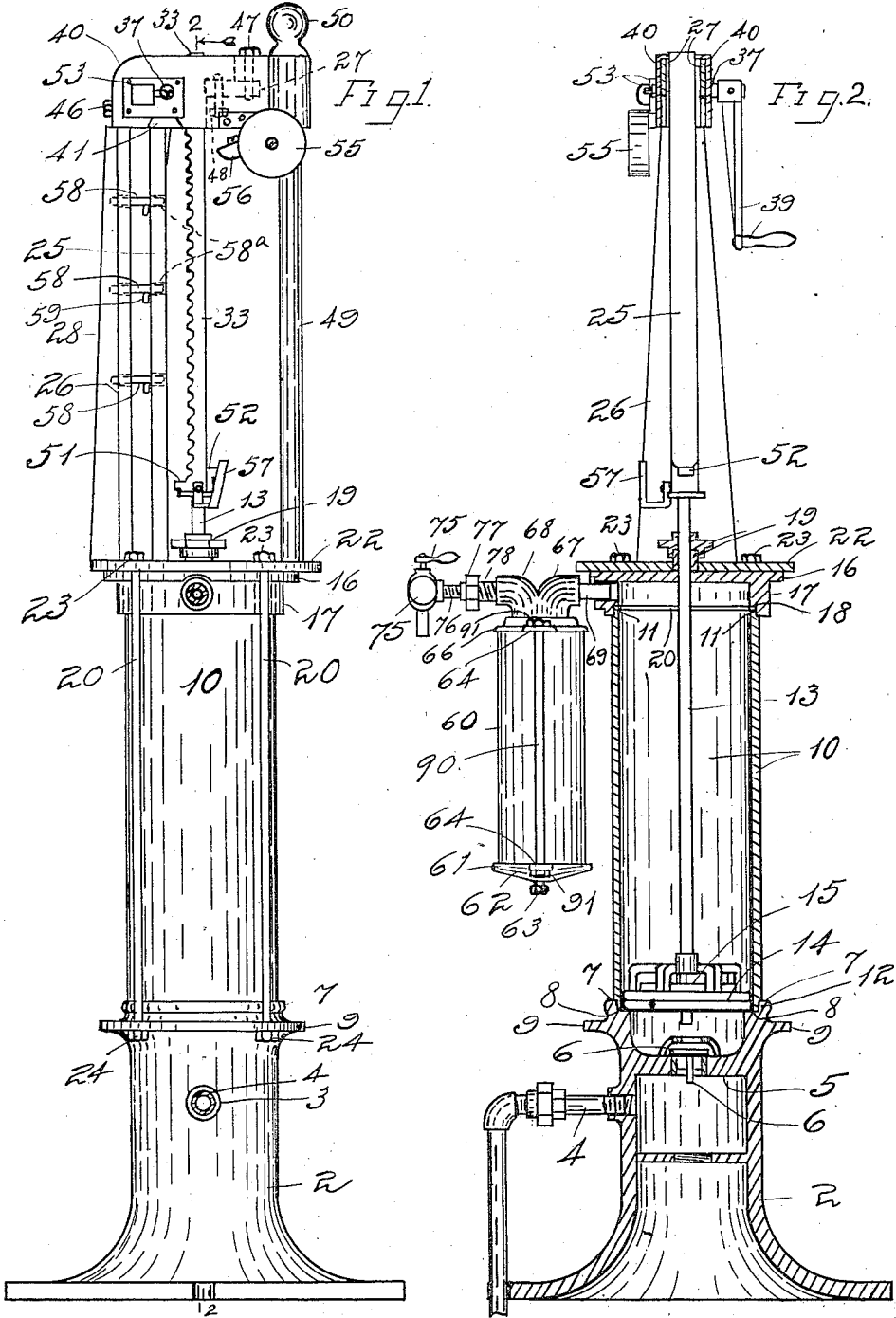
WITNESSES:
B. S. Lyon
S. R. Richard
INVENTOR:
John E. Lowe,
By H. M. Richard, atty.

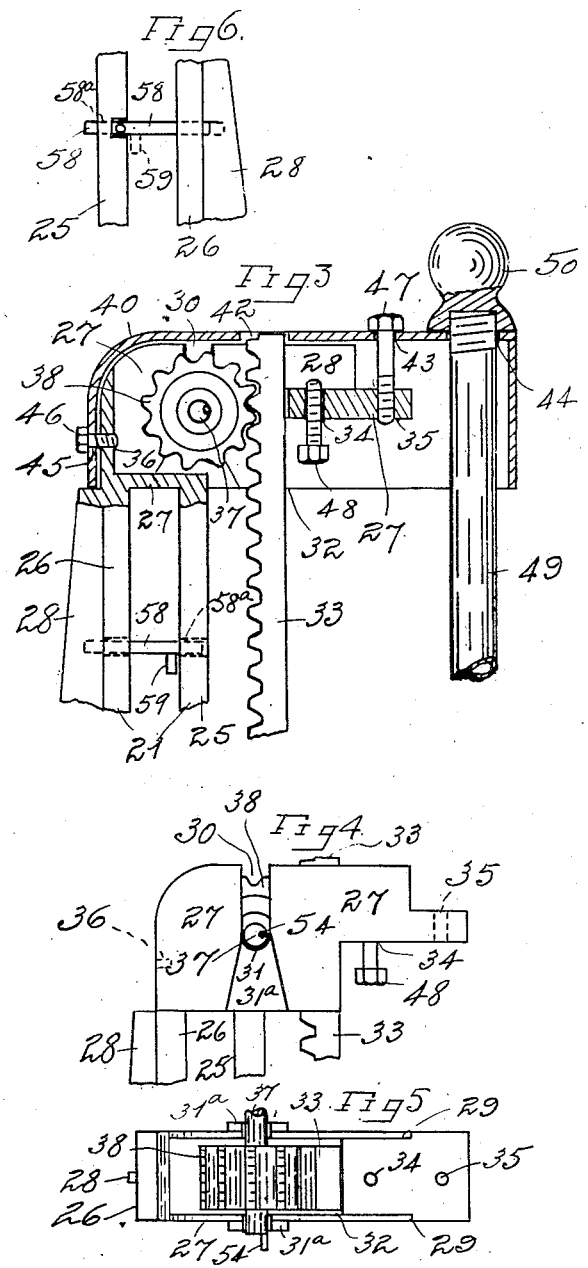

UNITED STATES PATENT OFFICE.

JOHN EARNEST LOWE, OF GOOD HOPE, ILLINOIS.

MEASURING-PUMP.

1,130,912.  Specification of Letters Patent.  Patented Mar. 9, 1915.

Application filed November 17, 1913. Serial No. 801,512.

*To all whom it may concern:*

Be it known that I, JOHN EARNEST LOWE, a citizen of the United States, and a resident of Good Hope, in the county of McDonough and State of Illinois, have invented a new and useful Measuring-Pump, of which the following is a specification.

The invention relates to measuring pumps, and the objects thereof are to generally improve the construction and increase the utility, accuracy and efficiency of devices of this character.

The invention accordingly consists in various improvements in pumps of this class or character, directed more particularly to the pump-head; to the gallon measure adjusting devices; to the fractional measuring means; to the means for assembling and disassembling, whereby these operations may be speedily done; and to carrying out of minor objects, some of which will be obvious and some specifically pointed out.

In the accompanying drawings, which illustrate my invention, Figure 1 is a side elevation, the inlet, filtering, and discharging means not shown; Fig. 2, a vertical, central, transverse section in the line 2—2 in Fig. 1, and showing also the elements above noted as not shown in said figure; Fig. 3, an enlarged detail, partly in section and partly in elevation; Fig. 4, a detail, a side elevation; Fig. 5, a top plan detail of the head and some of the elements engaged therewith; and Fig. 6, a fragmental detail, showing the gallon-fraction-measuring means shown in Fig. 3, but seen from the opposite side.

Considering said drawings in detail and referring to each element and part thereof (where required) by a distinguishing numeral, uniformly employed, 2 indicates a base having an aperture 3 for the reception of the inlet pipe 4. The interior annular flange 5 provides a seat for the lower valve 6, and the upper end is provided with a shoulder 7 and a seat 8, just below which is an annular flange 9.

10 is a cylinder, the upper and lower portions of which are provided respectively with tapered terminals 11, 12, the latter resting on the seat 8.

13 is a piston rod, and 14 a piston carried thereby and provided with a valve 15.

16 indicates a cylinder head, provided with an annular flange 17 having a seat 18 for a gasket 20 against which rests the terminal 11 of the cylinder. The head 16 fits snugly on the upper end of the cylinder 10 and the lower end of the latter fits snugly into the seat 8 in the base.

A frame, of which 22 indicates the base plate, is provided with an aperture for the engagement of a stuffing box 19 which has the usual axial bore for the passage of the rod 13.

20 designates each one of a plurality of rods, threaded at both ends. These rods pass each through apertures in the plate 22 and flange 9. A nut 23 engages the upper end of each rod 20, and a nut 24 engages its lower end. The cylinder is held securely in place by drawing these nuts down firmly on the threads of the rods, and in an evident manner.

Integral with the base-plate 22 are standards 25 and 26, united at their upper ends by a head 27, Fig. 6. 28 is a rib on the outer face of the standard 26. The head 27 comprises cheeks 29 having registering slots 30 providing each a bearing 31, provided in part by a boss 31ª. It is provided also with a vertically arranged aperture 32, Fig. 5, for the passage of a rack 33, presently described, and with similarly arranged threaded openings 34, 35.

36 is a horizontally arranged threaded aperture in said head.

37 designates a journal mounted in the bearings 31, and 38 is a pinion keyed thereon and adapted to mesh with and actuate the reciprocatory rack 33. 39 is a crank secured on said journal.

40 designates a cap having in its cheeks a pair of slots 41. In its top it is provided with a guideway 42 for the rack 33 and with an opening 43, and at one of its ends is an eye 44.

45 is a transverse opening in its end opposite the one noted. A bolt 46 is passed through the opening 45 in the cap 40 and engages the threaded opening 36 in the head, whereby the cap is secured firmly to the head.

48 is a gage-bolt, for a purpose presently described, threaded into the aperture 34 in the head, and, when the cap 40 is positioned, is not visible to an ordinary observer.

49 designates a rod, the lower end of which is threaded and engages a threaded opening in the plate 22, its upper end projecting through the eye 44 in the cap 40 and engaged by the interiorly arranged threads of a cap-nut 50.

Gage stops 51 and 52 are arranged on the respective faces of the rack bar. Register 53 is secured upon the cap 40 and adapted to be actuated by a wrist-pin 54, on the journal 37, as shown in Figs. 2 and 4.

55 is a counter having a tripping lever 56, and said lever is actuated by a trip 57 fixed to the rack bar, when said rack bar has reached its limit of movement.

53 is a register, suitably secured on the cap 40 and actuated by a wrist pin 54 carried by the journal 37.

55 is a counter having a tripping lever 56 adapted for registration by a trip 57 fixed to the rack bar.

58 is a bolt slidable and rotatable in a recess in the standard 26 and an opening through the standard 25, and is provided with a handle 59 by which it may be operated and also by which its extent of movement is limited. The stop 52 at the limit of upward movement of the rack bar engages the adjustable stop 48, thereby indicating the maximum limit, say one gallon delivered at a single stroke of the piston. By adjusting a particular bolt 58 so that a portion thereof projecting into the path of the stop 51, as indicated in Fig. 6 of the drawings, it is obvious that the rack bar may be limited to engagement to its stop 51 with such projected bolt. By this means fractional parts of a gallon or other specific predetermined measurement is delivered at a single stroke of the piston.

75 is the usual faucet, communicating with the discharge pipe 68 by means of any suitable connections 76, 77, 78.

Assume the parts to be in the relative positions shown in Figs. 1 and 2. Rotation of the crank 39 will impart like movement to the journal 37 and thereby to the pinion 38 and thereby raise the rack bar 33, which is in mesh therewith. The piston rod will be drawn therewith and the head 14 thereof will act on the valve 6 to draw a charge of oil from the source of supply connected with the inlet pipe 4 in an evident and ordinary manner. During this movement the trip 57 will contact the trigger 56 and actuate the counter 55, and simultaneously or approximately so the wrist 54 will actuate the register 53. The gage-boss 52 will strike and its extent of movement stopped by the adjustment or gage-screw 48 which engages the aperture 34 in the head 27. Adjustments of said screw may be made in order to accurately determine the (gallon) measure. The screw being out of sight is not liable to be tampered with, either intentionally or by accident.

Fractions of a gallon may be measured by actuations of either bolt 58 to bring its inner end through the opening 58$^a$ in the standard and into position to be struck by the gage-boss 51 on the rack bar 33. These gage-bolts are preferably placed to measure one, two, or three quarts, as shown in Fig. 1.

It is frequently necessary to examine the parts within the cylinder 10, and it is therefore desirable that its interior be easily and quickly accessible. Removal of either set of nuts 23 or 24 from the rods 20 permits of the plate 22 and all parts engaged therewith being lifted off the head 17, and said head may then be instantly removed from off the cylinder 10. It is desirable also that ready access may be had to the filter elements. Removal of either set of nuts 91 permits the tube 60 to be freed, and it may instantly be removed. The cap 40 may be removed from the head 27 by removal of the two screws 46 and 47 and the cap 50. The head being cast integral with the standards, and they being integral with the plate 22, provides a simple pump top which cannot be twisted or so assembled as to cause binding or strain on any of the parts. The brace-rod 49 lends additional strength.

Having thus described my invention, I claim as new:

A measuring pump including a cylinder, a piston therein, a piston rod connected to the piston, a frame removably secured to the cylinder, a hollow head carried by the frame, a rack bar connected to the piston rod and operable through the frame, a solid partition disposed within the head, and a screw stop adjustably mounted in said partition and arranged in the path of movement of said stop, said screw stop being wholly secured within the head.

In witness whereof, I hereto affix my signature this eleventh day of November, 1913.

JOHN EARNEST LOWE.

Witnesses:
  LOUISE EBB,
  WEBB A. HERLOCKER.